J. M. MARTIN.
HOLDER FOR DENTAL X-RAY FILMS.
APPLICATION FILED AUG. 10, 1920.
1,378,709. Patented May 17, 1921.
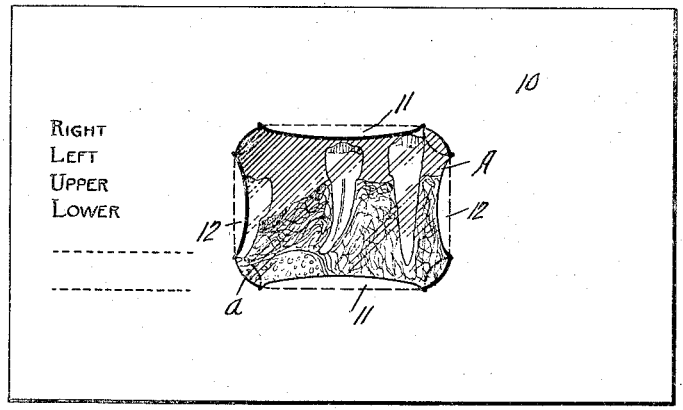
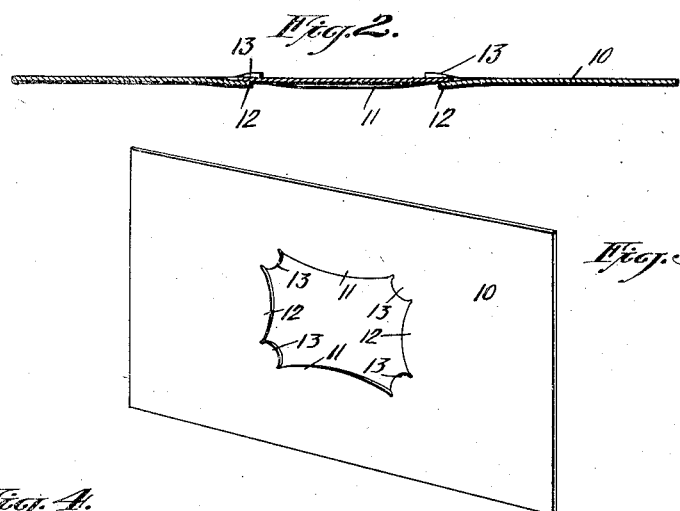
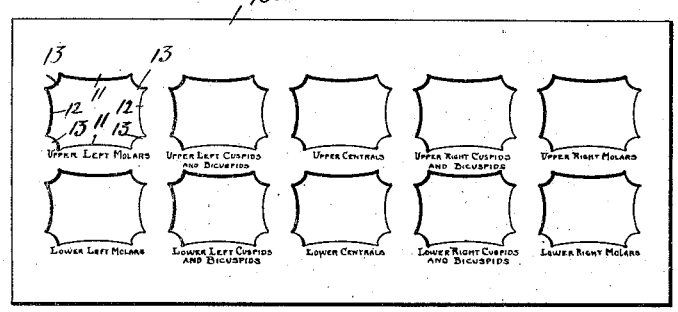
WITNESSES
INVENTOR
James M. Martin.
BY
ATTORNEYS

UNITED STATES PATENT OFFICE.

JAMES MADISON MARTIN, OF DALLAS, TEXAS.

HOLDER FOR DENTAL X-RAY FILMS.

1,378,709.   Specification of Letters Patent.   Patented May 17, 1921.

Application filed August 10, 1920. Serial No. 402,510.

*To all whom it may concern:*

Be it known that I, JAMES M. MARTIN, a citizen of the United States, and a resident of Dallas, in the county of Dallas and State of Texas, have invented a new and Improved Holder for Dental X-Ray Films, of which the following is a description.

My invention relates to holders for films of X-ray pictures taken of teeth for use by dentists.

An important object of the invention is to provide a holder to which the film may be secured with facility and in a manner to securely hold the film as well as to provide retaining members on the holder so formed and arranged as to blanket the minimum area of the film and thereby to expose the maximum area for transmitted light for the clear viewing of the film.

A further important object of the invention is to provide a holder in which two series of openings are presented pertaining respectively to the upper and lower jaws, the respective openings in each series having designations identifying the openings and hence identifying the pictures therein with particular teeth so that the two series will comprise pictures totaling views of the complete mouth and with the pictures in each series in the proper sequence, whereby the dentist or physician for whom the work is done or to whom the work is referred, may see at a glance just where diseased processes are located.

Reference is to be had to the accompanying drawings forming a part of this specification, it being understood that the drawings are merely illustrative of one example of the invention.

Figure 1 is a front view of a holder embodying my invention presenting an opening for a single picture, the view showing the film in position;

Fig. 2 is a longitudinal sectional view of the holder with the film therein;

Fig. 3 is a perspective view of said holder without the film;

Fig. 4 is a front view of a holder having series of openings for receiving pictures of particular groups of teeth in the upper and lower jaws respectively.

Referring at first more particularly to Figs. 1 to 3, the holder 10 which is made of cardboard or stiff paper and has the general character of a stiff card, is provided with a single opening to receive a film A, the opening being defined by edges comprising at the top and bottom convexed retaining members 11 of very slight width at their centers or points of greatest projection so as to have a retaining engagement with the longitudinal edges of the film while covering the minimum area of the film. Similarly, at the two opposite sides of the opening convex retaining members 12 are provided and like the members 11 each extends from a point adjacent to one corner of the opening to a point adjacent to the opposite corner at the same side of the opening. Thus, the retaining members 11 and 12 while presenting a total effective engaging surface because of their maximum length in extending from corner to corner overlap the picture to the minimum extent.

Between adjacent members 11 and 12 at each corner of the opening, a small retaining member 13 is formed on the holder and presents a convex edge. The relation of a retaining corner member 13 and the adjacent elongated retaining members 11 and 12 is such that acute entrant angles are provided at the sides of each corner member 13.

In the use of the holder the film A is applied thereto with the retaining members 11, 12 disposed at one side of the film while the corner retaining members 13 are disposed at the opposite side of the film. The film A is formed in practice with rounded corners *a* to prevent the film at the corners from catching on adjacent objects in the handling of the holder. The result is that the film may be inserted with facility and will be securely held, and approximately the complete area of the picture may be exposed to the light. On the face of the holder 10 several designations are provided, such as "Right," "Left," "Upper," "Lower," and preferably two blank lines so that the particular teeth pertaining to the upper or lower jaw may be witten in, to wit; molars, cuspids, bicuspids and centrals.

In Fig. 4 the holder 10ª presents two series of five openings each and these bear designations in sequence identifying the openings in one series for receiving pictures respectively of upper left molars; upper left cuspids and bicuspids; upper centrals; upper right cuspids and bicuspids; upper right molars, while the five openings in the other series bear designations in proper sequence identifying the openings for receiving pictures respectively of lower left molars;

lower left cuspids and bicuspids; lower centrals; lower right cuspids and bicuspids; lower right molars. Thus, in each series the openings for the centrals are centrally disposed in the series and those openings for pictures of teeth at the left and right respectively of the centrals have positions corresponding with the positions of these right and left teeth in the mouth relatively to the centrals. The two series of openings, Fig. 4, it will readily be seen, receive pictures of the upper and lower sets of teeth in a manner that the respective pictures are displayed in the relative positions of the teeth pictured. Thus, a picture of given teeth displayed on the holder at the proper opening serves to identify the picture with teeth of a given jaw and particular teeth of that jaw by the location of the picture, thus facilitating the examination by the dentist or physician and the ready identification by him of the particular teeth pictured.

I would state in conclusion that while the illustrated example constitutes a practical embodiment of my invention, I do not limit myself strictly to the exact details herein illustrated, since manifestly the same can be considerably varied without departure from the spirit of the invention as defined in the appended claim.

Having thus described my invention, I claim:

As a new article of manufacture, a film holder of the indicated class presenting an opening, said opening being defined at the four sides by elongated retaining members presenting convexed edges and each extending from a point adjacent to one corner to a point adjacent to the opposite corner; together with smaller retaining members presenting convexed edges and disposed at the corners to alternate with said elongated retaining members.

JAMES MADISON MARTIN.